Patented Jan. 3, 1950

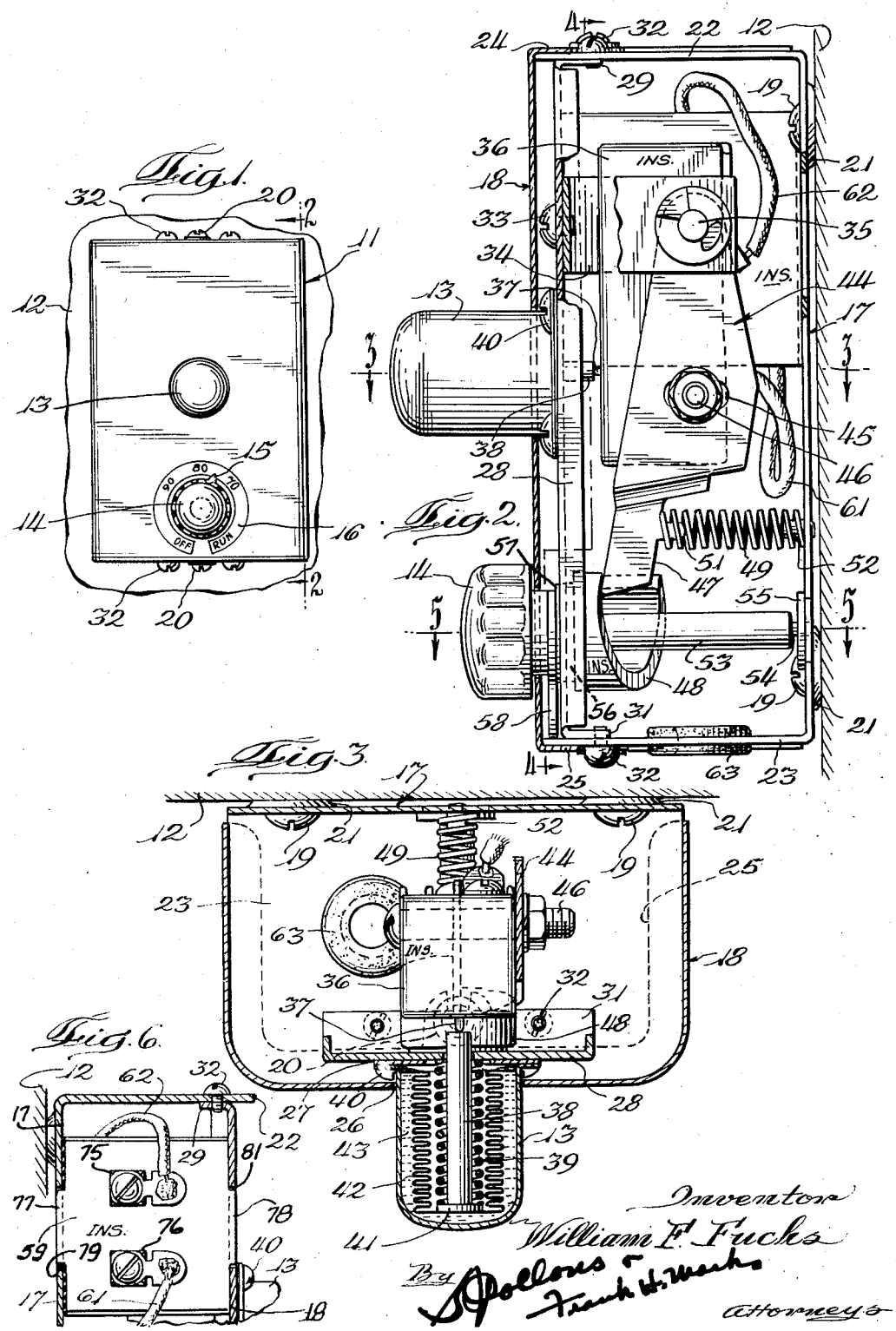

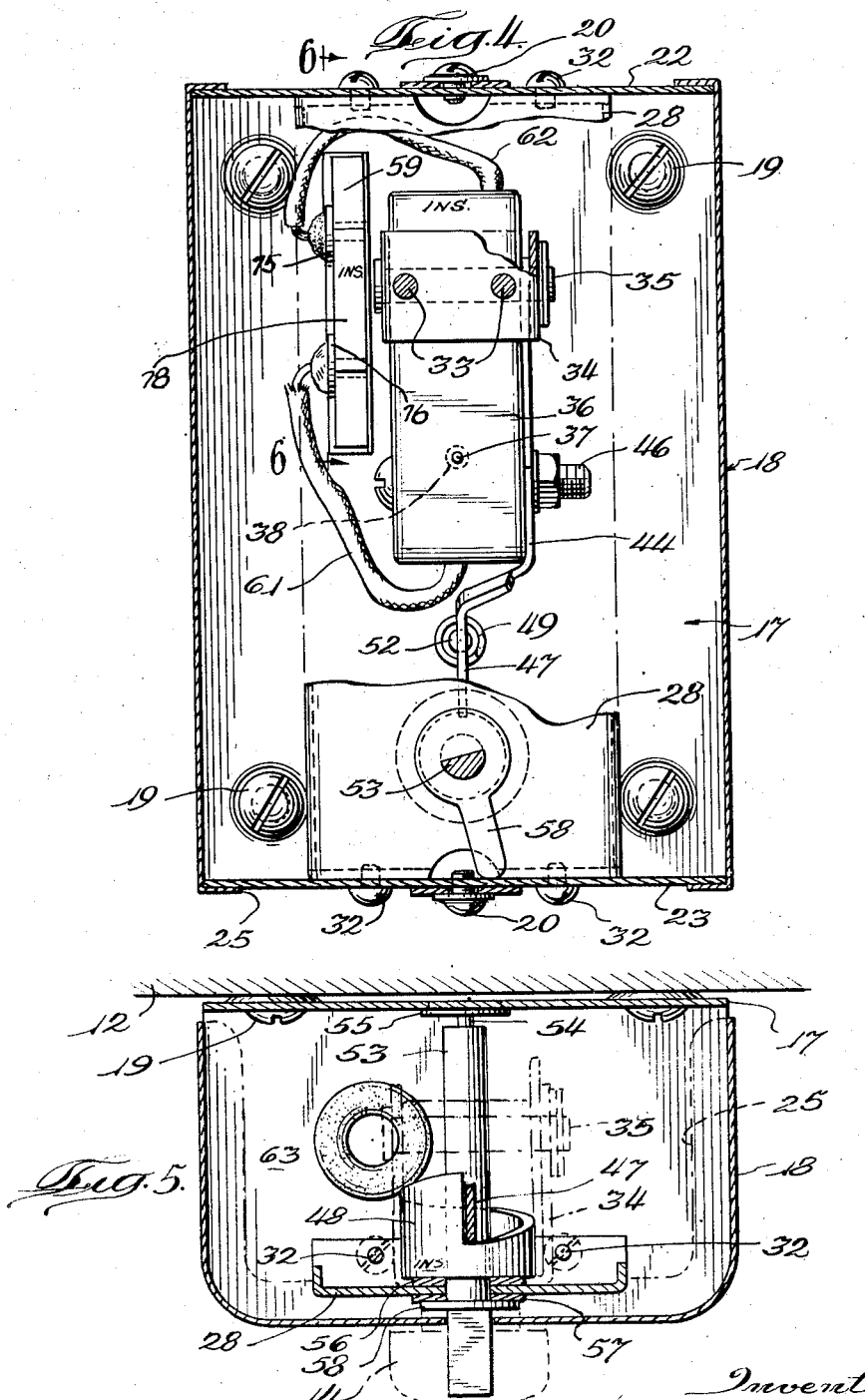

2,493,190

UNITED STATES PATENT OFFICE 2,493,190

VIBRATION-PROOF THERMOSTATIC SWITCH

William F. Fuchs, Spring Valley, Ill., assignor to Sampsel Time Control, Inc., Spring Valley, Ill., a corporation of Illinois Application December 19, 1946, Serial No. 717,247

2 Claims. (Cl. 200—140)

1

The present invention relates to automatic control devices and more particularly to a thermostatic control device.

The principal object of the invention is to provide a highly efficient thermostat of sturdy construction, which is also exceptionally sensitive to the temperature fluctuations.

Another object of the invention is to provide a temperature control device which is vibration proof, whereby any established setting will be retained despite the close proximity of the device to any source of vibration.

Specifically, the thermostatic device according to the present invention is adapted for use in locations which are subject to extreme variations in temperature; for example, attic rooms. As is well known, attics are subject to the intense heat of the sun, and in order to alleviate this condition forced ventilation is resorted to with the use of electric fans. Thus, in order to control the periodic operation of these fans, the thermostat according to the present invention is provided.

Briefly, the thermostatic device of the invention comprises a conveniently compact case which houses a short travel control switch preferably of the over-centering action type pivotally mounted, and spring biased to cooperate with a cam member adapted to be rotatably settable by means of a knob mounted on the face of the case. Also, projecting from the case is a dome shaped structure containing acetone, which is an expansible liquid readily responsive to temperature changes.

The foregoing and other objects and features of the invention will appear from the following description when taken in conjunction with the accompanying drawings, wherein, Fig. 1 is a front elevational view of the thermostatic control device according to the present invention;

Fig. 2 is a sectional view taken on line 2—2 of Fig. 1;

Fig. 3 is a cross sectional view taken on line 3—3 of Fig. 2;

Fig. 4 is a sectional view taken on line 4—4 of Fig. 2,

Fig. 5 is a sectional view taken on line 5—5 of Fig. 2, and

Fig. 6 is a longitudinal sectional view through a portion of the apparatus as best indicated on line 6—6 of Fig. 4.

Having reference to the drawings wherein like characters represent corresponding parts throughout the several views, the thermostat according to the invention is generally indicated 11 in Fig. 1, and is shown mounted on a wall 12. Projecting from the face of the thermostat housing is the dome-shaped structure 13 containing the heat sensitive liquid and other pressure responsive elements, hereinafter described. Also, projecting from the face of said housing is a knob or handle 14 which, as will presently appear, functions to regulate the setting of a control cam, which setting is manifested by an indicator 15, integral with the knob 14, cooperating with an index ring 16 suitably graduated with temperature indications.

The housing of the thermostat 11 comprises essentially a base portion 17 and a cover portion 18. The base portion 17 is adapted to be secured to the wall 12 by means of screws 19, the holes for the screws 19 being made in embossed areas 21 which serve as bearing points for the thermostat 11 against the wall 12. The portion 17 is also provided at top and bottom with outwardly directed flanges 22 and 23. The cover portion 17 is also provided at top and bottom with inwardly directed flanges 24 and 25 which are adapted to fit over the flanges 22 and 23, respectively, and to which they are secured by screws 20, or like attachment.

The cover portion 18 is provided substantially centrally of the front wall thereof with a hole 26 through which the dome shaped structure 13 protrudes. The dome 13 is flanged outwardly at its open end and is provided thereat with a cover plate 27, and is securely mounted on a vertically disposed U-shaped member 28 spaced from the front wall of the cover portion 18. Member 28 is provided at its upper and lower ends with laterally disposed flanges 29 and 31, respectively, through the medium of which the member 28 is secured to the flanges 22 and 23 of base portion 17 by screws 32.

Secured to member 28 by means of screws 33 is a U-shaped bracket 34, and journaled in the flanges of bracket 34 is a shaft 35 on which is rockably carried an over-centering action switch 36 of well known commercial design such as of the type illustrated in U. S. Pat. no. 1,960,020 provided with single throw circuit opening contacts. Switch 36 is provided with a pin or plunger 37 for operating the switch, and pin 36 cooperates with a plunger 38 carried in the dome 13. The plunger 38 is retractively held in dome 13 by a coiled spring 39 encircling said plunger, and is caused to normally abut the closed end 41 of a bellows 42.

Bellows 42 is preferably made of copper or like ductile and resilient metal and is flanged outwardly at its open end and thereat soldered to the dome flange and clamped between the dome 13 and plate 27 by screws 40. Bellows 42 is spaced from the dome 13 to provide an annular space 43 which in the present embodiment of the invention is filled with acetone.

Pivotally mounted on shaft 35 and positioned between the switch 36 and one of the flanges of the bracket 34 is a lever 44. Lever 44 is adjustably related to switch 36 by means of slot 45 in lever 44 and a clamping bolt 46 extending through the switch. As viewed in Figs. 4 and 5, lever 44 in the present embodiment is bent to aline its arm 47 with the vertical axis of the thermostat.

Arm 47 of lever 44 cooperates with the helical cam face of cam 48 of non-conducting material. A coiled spring 49 compressed between arm 47 of lever 44 and base portion 17, and guided by projections 51 on arm 47 and pin 52 on portion 17, normally holds arm 47 against the cam face of cam 48. Moreover, spring 49 normally biases lever 44 in a clockwise direction, as viewed in Fig. 2.

Cam 48 is fixed to a shaft 53, the reduced end 54 of which is journaled in a bearing 55 secured to base portion 17. The other end of shaft 53 (as viewed in Fig. 5) is journaled in a bearing composed of member 28 and a pair of discs 56 and 57. The projecting end of shaft 53 beyond the disc 57 is reduced to semi-cylindrical shape to form a non-rotational shafting for a limiting or stop member 58 carried on shaft 53 between disc 57 and knob 14 (Figs. 2 and 5).

Suitably mounted in the thermostat adjacent switch 36 is a terminal block 59 of non-conducting material, and mounting the terminal lugs 75 and 76, to which conductors 61 and 62 are connected, these conductors being also connected to the contact elements of switch 36. The mounting or terminal block 59 is provided with a pair of anchor projections 77 and 78, the former of which is received in a rectangular opening 79 formed in base portion 17 on the latter of which is similarly supported in a rectangular opening 81 in the cover portion 18. An insulated bushing 63 is mounted in flange 23 of base portion 17 to provide an outlet for the external conductors or leads.

In the operation of the thermostatic control device according to the present invention, the device 11 may be installed or mounted near the fan it is desired to control, since the vibration of the fan will not disturb the setting of the control device. The knob 14 is manipulated to rotate the cam 48 to any desired position to establish the temperature setting sought to be maintained in the attic or other heated area it is intended to ventilate. The arm or extension 47 normally bears against the helical cam face or edge of cam 48 by means of spring 49, and the angular relation between the lever 44 and the switch 36 is established in a predetermined position by the slot and screw adjustment 45 and 46, respectively. By virtue of this adjustment, the exact relation between plunger 38 and pin 37 is determined so that in accordance with a predetermined temperature level, the acetone 43 in the dome 13, will, in response to the temperature change, act upon the bellows 42 to operate the plunger 38, which coacts with the pin 37 to govern the sensitive switch 36 to open or close an electrical circuit, for example, to cause the operation of an electric fan or exhaust device.

Although a specific embodiment of the invention has been shown and described, it is intended that all forms shall be embraced which come within the scope and equivalency of the appended claims.

The invention claimed is:

1. A device for thermostatically controlling electrically operable exhaust fans comprising a sheet metal housing including a back panel and spaced end panels, an instrument plate secured to said end panels, a micro-action switch unit pivotally supported on a bracket which is mounted at one end of said instrument plate, a follower arm adjustably carried by said switch unit and having a follower projection disposed over an opposite end of said instrument plate, a cylindrical regulator rotatably mounted in said opposite end of said instrument plate having a helical cam surface against which said follower projection of said arm is adapted to impinge, a spring urging said follower arm against said helical cam surface and thereby yieldably maintaining said switch unit in a forward position, and a thermostatically responsive unit comprising a Sylphon bellows actuated plunger for operating said switch unit by pressing a switch element thereof in a direction opposing said compression spring whereby excessive projection of said Sylphon bellows plunger as during temperature extremes may act to compress said spring and to cause said switch unit to recede from its said forward position when the full movement of said switch element has been spent.

2. A device for thermostatically controlling electrical apparatus comprising a housing, an instrument plate secured to said housing, a switch unit pivotally supported on a bracket at one end of said instrument plate within said housing, a follower arm carried by said switch unit and having a portion disposed over an opposite end of said instrument plate within said housing, a cam comprising a rotary adjustment for engaging said follower arm portion, a spring urging said follower arm into impingement with said cam and thereby yieldably maintaining said switch unit as well as said arm in a forward position, and a thermostatic device for actuating a switch element of said unit by pressing in a direction opposing said spring whereby excessive pressure of said thermostatic device will compress said spring and thereby avoid rupture of the components of said switch unit.

WILLIAM F. FUCHS.

REFERENCES CITED

The following references are of record in the file of this patent:

UNITED STATES PATENTS

| Number | Name | Date |
| --- | --- | --- |
| 1,934,607 | Bauman | Nov. 7, 1933 |
| 2,033,417 | Dezotell | Mar. 10, 1936 |
| 2,094,319 | Faust | Sept. 28, 1937 |
| 2,171,272 | Kronmiller et al. | Aug. 29, 1939 |
| 2,174,050 | Willett | Sept. 26, 1939 |